May 13, 1930.					C. L. SHEPPY					1,758,412
LIQUID FILTER
Filed Jan. 26, 1926
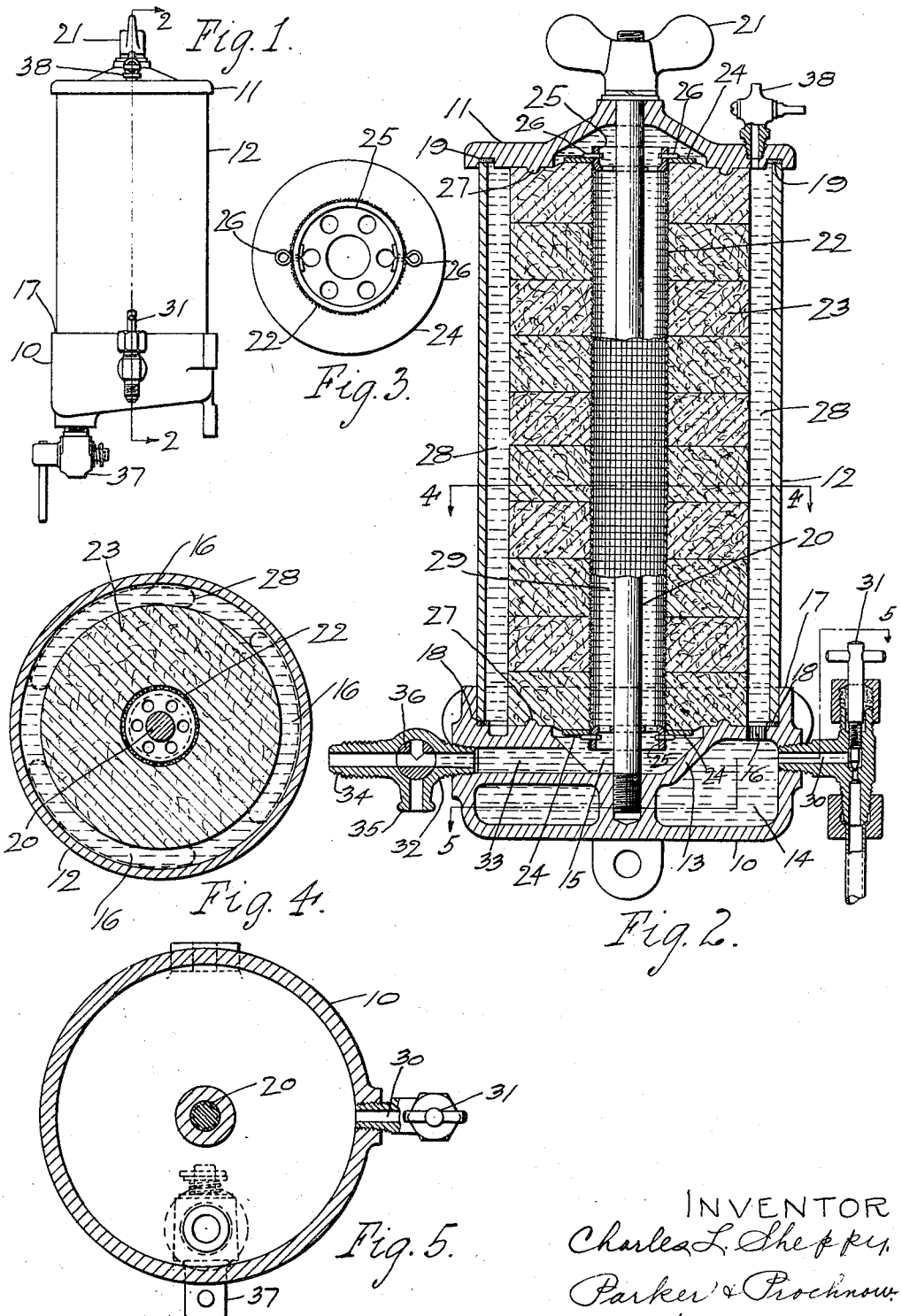
INVENTOR
Charles L. Sheppy,
Parker & Prochnow.
ATTORNEYS Patented May 13, 1930

1,758,412

UNITED STATES PATENT OFFICE

CHARLES L. SHEPPY, OF BUFFALO, NEW YORK, ASSIGNOR TO THE PIERCE ARROW MOTOR CAR COMPANY, OF BUFFALO, NEW YORK

LIQUID FILTER

Application filed January 26, 1926. Serial No. 83,905.

This invention relates to improvements in liquid filters, and more particularly to a filtering device designed for use on motor vehicles in connection with the pressure lubricating systems of the same, for filtering or cleaning the lubricating oil substantially continuously during the operation of the lubricating system so as to rid the oil of carbon and other impurities. The oil filters heretofore used or proposed for the purpose stated have been of complicated or expensive construction, or are not capable of being readily cleaned when the filtering media become clogged or fouled with the impurities separated from the oil, and it is a matter of considerable inconvenience or expense to clean or renew the filtering media, so that as a consequence, the media are not cleaned or replaced as frequently as they should be, and the filters fail to operate efficiently or cease to function altogether.

The objects of my invention are to produce a practical and desirable filter which is of simple and inexpensive construction, but which nevertheless will insure efficient filtering of the oil, and which can be quickly and easily cleaned when the filtering medium becomes clogged or its filtering action impeded by the impurities in the oil, so as to render the filter again effective; also to construct the filter so that air or other fluid under pressure can be readily applied for blowing or forcing the oil in a reverse direction through the filtering medium to rid it of impurities without the necessity of removing or disturbing the filtering medium or element, and to enable this to be done by a simple operation of valves which control the flow of the oil through the filter; also to arrange and mount the filtering medium or element in the device in such a manner that it can be readily removed as a unit from the filter casing for cleaning or renewing the filtering medium when this may become necessary; also to construct and arrange the filtering element so that the filtering medium, which preferably consists of a single-piece or sectional annular body of felt or other suitable fibrous material, can be quickly and easily assembled and secured on a supporting tube or screen which, with the filtering body mounted thereon, can be readily placed in position in and removed as a unit from the filter casing; also to construct the filter so that after the filtering element has been placed in the filter casing it is compressed and secured in place between the movable cover and an opposing part of the filter casing, and the joints between the parts of the case sealed by the simple operation of securing the cover in place; and also to improve the construction of filters for oil or other liquids in the other respects hereinafter described and set forth in the claims.

In the accompanying drawings:

Fig. 1 is a side elevation on a reduced scale, of a filter embodying my invention.

Fig. 2 is a sectional elevation thereof on an enlarged scale on line 2—2, Fig. 1.

Fig. 3 is a top plan view of the tubular screen or support and securing means for the filtering disks.

Fig. 4 is a horizontal section of the device on line 4—4, Fig. 2.

Fig. 5 is a sectional plan view thereof on line 5—5, Fig. 2.

The filter comprises an enclosing casing or container and an annular filtering element which is removably secured in the casing between opposite parts thereof so as to form in the casing an outer liquid space surrounding the filtering element and an inner liquid space centrally within the filtering element, and liquid supply and discharge connections whereby the liquid is admitted to one of said spaces, preferably the outer annular space and is forced through the filtering element into the other liquid space from which the liquid discharges through the discharge connections. The casing is also provided with a settling chamber in which the sediment or impurities filtered out of the liquid are adapted to settle, and from which the impure liquid and sediment can be readily drained off. Provision is also made whereby the filtering medium can be cleared of impurities by means of air or fluid pressure applied so as to cause a reverse flow of the liquid through the filtering medium.

In the preferred construction of the filter shown in the drawings, the casing comprises a base 10, a cap or cover 11 and an open ended, preferably cylindrical shell 12, which is clamped between the base and cover so as to form a closed container. The base is provided with a wall or diaphragm 13 which forms in the base a liquid settling chamber 14 and a central liquid flow or discharge chamber 15, the wall 13 being provided near its outer edge or periphery with one or more openings 16 through which the liquid can pass from the settling chamber 14 into the body of the casing, or descend from the latter into the settling chamber. Also, the base is preferably provided with an upwardly projecting, peripheral flange 17 within which the lower end of the shell 12 is removably seated on a suitable packing gasket 18 on the wall at the inner side of the flange. The cover 11 preferably has an annular groove which the upper end of the shell 12 is adapted to enter to seat against a packing gasket 19 in the groove to form a liquid tight joint between the upper end of the shell and the cover. The cover is secured in place so as to clamp the shell 12 between the same and the base by suitable means, preferably consisting of a tie rod 20 which is screwed at its lower end into a threaded central socket in the base and extends up through a central hole in the cover, and a wing or other nut 21 screwed on the upper end of the tie rod and adapted to press down the cover. By tightening this nut, the cover is forced down upon the upper end of the shell, the latter being thereby clamped firmly against its seat in the base, forming liquid-tight joints between the opposite ends of the shell and the base and cover.

The filtering element comprises an upright perforate tube or screen 22, preferably made of wire mesh fabric, and an annular body 23 of a suitable filtering material such as felt, preferably made with the fibers or grain extending more or less radially, or so as to enable the requisite flow of the oil or liquid radially through the annular filtering body, preferably from the outer to the inner periphery thereof. The annular filtering body can be made in a single piece or in sections or disks sleeved on the supporting tube end to end and held thereon between retaining rings or members 24 at the opposite ends of the perforate tube. Preferably a flanged circular plate or strengthening member 25 is soldered or otherwise permanently secured in each end of the perforate tube, whereby the tube is strengthened and retained in the intended cylindrical form, and the retaining rings 24 are slipped over the ends of the tube and removably secured in place as by means of cotter pins 26 passing through holes in the ends of the tube and in the flanges of the end plates 25. The filtering disks can thus be readily slipped on the supporting tube and secured thereon by fastening the retaining rings 24 in place, the filtering disks being compressed together somewhat when securing them on the tube, so that they will be firmly clamped together between the retaining rings. If necessary, the contacting faces of the filtering disks can also be cemented together to form a single, continuous filtering body and prevent leakage of the liquid through the joints between the disks. Instead of making the filtering body of the separate sections secured face to face, as shown, it could be made or molded in a single-piece tube, but it is considered that better results are secured by the described sectional construction, owing to the difficulties of producing the single-piece, continuous filtering tube of felt or the like material.

The annular filtering element thus formed is removably clamped in place in the filter casing between the base 10 and the cover 11, which are preferably provided with annular ribs or projections 27 adapted to bear against the opposite end of the compressible annular filtering body. These ribs 27 of the base and cover which engage the ends of the compressible filtering material are so disposed with reference to the seats in the base and cover for the opposite ends of the shell 12, that when the cover 11 is tightly secured on the shell, the ribs 27 will compress the filtering material between them and firmly clamp the filtering element in place in the casing and form liquid-tight joints between the opposite ends of the filtering element and the base and cover respectively of the casing. Nevertheless, by this construction, when the cover 11 is removed, the filtering element is released and can be withdrawn as a unit through the open, upper end of the casing. Thus, to secure the filtering element in the casing, it is only necessary to place the same in the casing in which it is held centrally by the tie rod 20, and place and secure the cover 11 in position; and to remove the filtering element, it is only necessary to release and remove the cover, when the filtering element can be immediately withdrawn through the open end of the casing without the necessity for releasing or operating any additional securing means. This permits the filtering element to be readily taken out of the filter and washed with a suitable solvent to remove any sediment or impurities therefrom, or when necessary, to remove the filtering body from the supporting tube and replace it by a new or clean filtering body.

When the filtering element is secured centrally in place in the casing, as explained, an outer, annular liquid space 28 is formed in the casing surrounding the annular filtering element, and an inner liquid space 29 is formed within the filtering element, said spaces communicating with each other only through the pores of the filtering element. The inner space 29 communicates at its lower end with the flow or discharge chamber 15 in the base, and the outer space 28 communicates by the openings 16 with the inlet or settling chamber 14 in the case, so that liquid can flow from the inlet or settling chamber 14 through the openings 16 into the outer liquid space 28 and pass through the filtering material into the inner space and discharge through the discharge chamber 15.

A liquid inlet connection 30 equipped with a controlling valve 31 is connected to the casing, preferably to the base 10 so as to admit the liquid to the inlet or settling chamber 14, and a liquid discharge connection or fitting 32 is preferably secured to the base in communication with a passage 33 in the base leading to the discharge chamber 15. In order to permit the filter to be readily flushed or cleaned by the admission of fluid under pressure without removing the filtering element, the discharge connection 32 preferably has two branches or nipples 34 and 35 controlled by a two-way valve 36 of any suitable construction. When this valve is moved to one position the nipple 34 is connected with the discharge passage 33 so as to permit the discharge of filtered liquid from the discharge chamber 15, and when the valve is moved to another position, it closes the liquid discharge nipple and places the other nipple 35 in connection with the discharge passage. By thus adjusting the valve to the latter position, if the liquid inlet valve 31 is closed and a compressed air supply tube or pipe is connected with the air admission nipple 35, air or other fluid under pressure can be forced into the filter through the liquid discharge passage so as to drive the liquid back or in a reverse direction through the filtering material from the inner liquid space 29 through the filtering material to the outer liquid space 28 surrounding the annular filtering element, and thereby free the filtering element from impurities or sediment which may more or less clog the same. Before admitting the air pressure, a drain cock 37 connecting with the bottom of the settling chamber is first opened so that the air or fluid pressure will drive the liquid out through the outer liquid space 28, the settling chamber and the drain cock. Thus, the filtering element can be cleared of obstructing material without removing the same from the casing. If the filtering element has become so badly fouled with solid matter to prevent it from being effectually cleared in this manner, the element can be removed from the casing as before explained, and cleaned by soaking it in a suitable solution, or if necessary, the filtering element can be replaced by a new or clean element.

As before explained, the filter described is primarily designed for use on a motor vehicle in connection with the lubricating system thereof, for filtering the oil during the operation of the vehicle. When so used, the inlet 30 for the impure oil is joined by a suitable pipe or connection with the oil pressure system between the usual pressure gage and the usual pressure regulating valve or device, while the outlet 34 for the filtered liquid is joined by a suitable pipe or connection with the engine crank case or oil pump chamber. By these connections a portion of the oil passes continuously through the filter and is cleaned during the operation of the lubricating system, the pressure of the oil in the filter varying with variations of pressure in the system. It is not necessary to disconnect any of the oil connections for cleaning out the filter by means of air or fluid under pressure, but simply to connect the air supply tube to the admission nipple 35 and adjust the valves as before explained. Neither is it necessary to disturb any of the fluid connections for removing and replacing the filtering element. The air admission nipple 35 also serves as a convenient means for indicating whether the oil is passing through the filter, it being only necessary to turn the valve 36 to open the nipple and observe whether or not oil discharges therefrom. If oil does not then discharge it shows that the filter is clogged and needs cleaning.

38 indicates an air vent cock on the cover 11 of the filter casing. When first starting the operation of the filter this vent is preferably opened to permit the escape of air from the filter casing so that less time will be required to fill the outer liquid space 28 with the oil and secure the maximum efficiency of the filter. By opening this vent it is also possible to quickly drain the filter through the drain cock without supplying air or fluid under pressure through the pressure admission connection.

I claim as my invention:—

1. In a liquid filter, the combination of an enclosing casing having a removable cover, an annular filtering element of compressible resilient, coherent self shape retaining filtering material open at both ends and arranged in said casing to form an outer liquid space in the casing surrounding said filtering element and an inner liquid space within the filtering element, means for forcing said cover to a tight seat on said casing, said cover and an opposed part of said casing having annular portions which press on the opposite ends of said compressible filtering element and act when the cover is forced to its seat on the casing to compress and clamp said annular filtering element between said opposed parts of the casing and form tight joints between the ends of the filtering element and the casing parts contacting therewith, and connections for admitting liquid to one of said liquid spaces and discharging it from the other liquid space.

2. In a liquid filter, the combination of an enclosing casing having a closed end and an open end, a removable cover for said open end, an annular filtering element of compressible resilient, coherent self shape retaining filtering material open at both ends and arranged in said casing between said closed end and cover and forming an outer liquid space in the casing surrounding said filtering element and an inner liquid space within said filtering element, means for forcing said cover to a tight seat on the open end of said casing, said cover and closed end of the casing pressing directly against the opposite ends of said compressible filtering element and acting by the forcing of said cover to a seat on the casing to compress and clamp the filtering element between said cover and the closed end of the casing, and close the ends of the said element against direct communication with the space of said casing between said ends and liquid inlet and discharge connections, one communicating with said outer liquid space and the other with said inner liquid space.

3. In a liquid filter, the combination of an enclosing casing open at its upper end and having in its base a wall forming a settling chamber and a separate liquid flow chamber, an annular filtering element arranged in said casing on said wall and forming an outer liquid space surrounding said element and communicating with said settling chamber and an inner liquid space within said filtering element which communicates with said liquid flow chamber, a removable cover which closes the open end of said casing and the upper ends of said outer and inner liquid spaces and directly engages and removably clamps said filtering element in place, said filtering element being released and removable from the casing by removing said cover and directly engaged and clamped by the cover while closing, liquid inlet and discharge connections one communicating with said outer liquid space and the other with said liquid flow chamber, and a drain cock for draining the liquid from said settling chamber.

4. In a liquid filter, the combination of a casing having one end closed and a removable cover at the opposite end of the casing having a relatively fixed seat, and an annular filtering element arranged in said casing and forming in the casing an outer liquid space surrounding said element and an inner liquid space within said element, said element comprising a perforate supporting tube and an annular body of compressible coherent self shape retaining filtering material removably secured on said tube, said filtering element being open at both ends and removably clamped in said casing between said closed end and said fixed seat of the cover of said casing which directly engage and close the opposite ends of said compressible filtering body and compress it when the cover is closed, and said element being released and removable as a unit when said cover is opened, said casing having a passage leading through one end to the said inner space and another passage to the said outer space.

5. In a liquid filter, the combination of an enclosing casing provided in its base with a settling chamber and a separate liquid discharge chamber, and an annular seat between said chambers, an annular compressible filtering element removably arranged in said casing upon said seat and forming an outer liquid space surrounding said element and communicating with said settling chamber and a separate inner liquid space within said filtering element communicating with said liquid discharge chamber, said casing having an open top through which said element may be removed or inserted, and a removable cover normally closing said open top and having a seat fixed relatively thereto and movable therewith to engage said element and compress it firmly against said annular seat by the act of closing said cover on said casing, a drain cock leading from said settling chamber, a liquid inlet connection communicating with said outer liquid space and provided with a controlling valve, an outlet connection leading to said discharge chamber, and means by which said outlet connection may be shut off and fluid under pressure admitted to said discharge chamber, whereby when said inlet and outlet connections are shut off and said drain cock is opened, said fluid may be passed through said element in a direction to dislodge solid matter from the inlet surface of said filter and remove it from the casing through said drain cock.

6. In a liquid filter, a closed casing at least one end of which is removable to permit access to the interior of the casing, a tubular, compressible, resilient filter element of self shape retaining material disposed in said casing and directly clamped under pressure between the ends thereof by the closing of the removable end, said element being spaced, along at least the major portion of its lateral peripheral surface, from the casing to form a chamber around the element, the contact of the ends of the casing with the ends of said element closing communication between said chamber and the interior space of said tubular element, said casing having separate fluid passages leading to the interior space of said element and to said chamber, whereby a fluid passing through said casing between said passages will be forced to travel through said element.

7. In a liquid filter, a closed casing, at least one end of which is removable to permit access to the interior of the casing, a tubular screen disposed endwise in said casing, flange members, at least one of which is removable, provided on the end portions of said screen, and a tubular filter member mounted on said screen and confined against removal therefrom by said flange members, one end of the casing having a fluid passage with an opening into the casing aligned with and larger than the screen to permit entrance therein of one of said flange members, the other end of the casing having a cavity to receive the opposite end of the screen and flange member thereon, the ends of the casing around the screen and flange members bearing against the ends of the filter member to clamp the filter member under pressure between the ends of the casing and close communication between the inside and outside of the filter member at its ends, removal of one end of the casing permitting removal of the screen and filter member, said filter member being spaced largely along its lateral peripheral surface from the casing to provide a chamber, and said casing having a fluid passage connection to said chamber.

8. In a liquid filter, a closed casing, at least one end of which is removable to permit access to the interior of the casing, a tubular screen disposed endwise in said casing, flange members, at least one of which is removable, provided on the end portions of said screen, a tubular filter member mounted on said screen and confined against removal therefrom by said flange members, one end of the casing having a fluid passage with an opening into the casing aligned with the screen, the other end of the casing having a cavity to receive the opposite end of the screen and flange member thereon, the ends of the casing around the screen and flange members bearing against the ends of the filter member to clamp the filter member under pressure between the ends of the casing and close communication between the inside and outside of the filter member at its ends, a tie member extending between said casing ends, anchored to one casing and passing thru the other casing end, and means on the anchored end of the tie member adjustable thereon to clamp said removable end to the body of the casing and compress the filter member between the casing ends, removal of one end of the casing permitting removal of the screen and filter member, said filter member being spaced largely along its lateral peripheral surface from the casing to provide a chamber, and said casing having a fluid passage connection to said chamber.

9. In a liquid filter, a closed casing, one end of which is removable to permit access to the interior of the casing, a stem extending from the closed end of the casing lengthwise within the casing and through the removable end, a cylindrical screen having rings fitted therein, at spaced points along the same, and slidingly engaging said stem to position said screen, a resilient and compressible filtering medium confined on the exterior of said screen and abutting against the closed end of the casing when placed within the casing with said screen mounted on said stem, and means acting between said stem and the removable end of the casing for clamping said removable end firmly to the casing and said filtering medium between said ends to close the space between the outside of said filtering medium and the screen, said casing having passages leading to the interior of said screen and the space surrounding said medium, whereby liquid may be forced through said filtering medium.

10. In a liquid filter, a closed casing having a removable end to permit access to the interior of the casing, a tubular screen disposed endwise in said casing and removable therefrom, self shape retaining filtering material confined on and compressible along said screen to peripherally enclose the same, and means for clamping said removable end in closed position on said casing without rotation of the removable end, said removable end directly engaging and compressing said filtering medium and clamping it under compression against the opposite end of the casing as the removable end is drawn into closed position on said casing, said casing having a passage leading to the interior of said screen, and another passage leading to the portion of said casing surrounding said medium, whereby a liquid may be forced through said medium.

11. In a liquid filter, a filter element comprising a tubular mat-like body of coherent fibrous material of self shape retaining properties, with a large proportion of the fibres thereof arranged somewhat radially of the tubular body to facilitate the passage of liquid through the tubular body.

12. In a liquid filter, a tubular, mat-like body of coherent fibrous material having the fibres arranged largely in a radial direction, and means for passing a liquid to be filtered through said body somewhat radially thereof.

CHARLES L. SHEPPY.